United States Patent
Komaki et al.

(10) Patent No.: US 6,667,952 B2
(45) Date of Patent: Dec. 23, 2003

(54) OPTICAL STORAGE MEDIUM HAVING A SPECIFIC LIGHT TRANSMITTING LAYER FOR SMALL LASER BEAM AND HIGH LINEAR VELOCITY

(75) Inventors: Tsuyoshi Komaki, Chuo-ku (JP); Hideki Hirata, Chuo-ku (JP); Tatsuya Kato, Chuo-ku (JP)

(73) Assignee: TDK Corporation, Tokyo (JP)

( * ) Notice: Subject to any disclaimer, the term of this patent is extended or adjusted under 35 U.S.C. 154(b) by 164 days.

(21) Appl. No.: 09/887,434

(22) Filed: Jun. 25, 2001

(65) Prior Publication Data

US 2002/0015378 A1 Feb. 7, 2002

(30) Foreign Application Priority Data

Jun. 26, 2000 (JP) ........................... 2000-191787
Nov. 29, 2000 (JP) ........................... 2000-363891

(51) Int. Cl.$^7$ ................................. G11B 7/24
(52) U.S. Cl. .................... 369/275.5; 428/64.4; 369/283
(58) Field of Search ............................. 369/275.5, 283, 369/275.1, 275.4, 286, 280; 428/64.4, 64.1, 64.3; 430/320, 321, 270.11

(56) References Cited

U.S. PATENT DOCUMENTS

| | | | | | |
|---|---|---|---|---|---|
| 4,310,919 A | * | 1/1982 | Slaten | ...................... | 369/275.5 |
| 5,011,879 A | * | 4/1991 | Uesaka et al. | ............... | 524/290 |
| 5,530,086 A | * | 6/1996 | Fuji et al. | ................... | 528/193 |
| 5,838,646 A | * | 11/1998 | Watanabe et al. | ............. | 369/13 |
| 5,914,915 A | * | 6/1999 | Watanabe et al. | ............. | 369/13 |
| 6,353,592 B1 | * | 3/2002 | Kashiwagi et al. | ...... | 369/275.5 |
| 6,376,571 B1 | * | 4/2002 | Chawla et al. | ................ | 522/64 |

FOREIGN PATENT DOCUMENTS

| | | | | |
|---|---|---|---|---|
| EP | 0 182 585 | 5/1986 | | |
| EP | 0 509 671 | 10/1992 | | |
| EP | 0 626 683 | 11/1994 | | |
| EP | 0 976 777 | 2/2000 | | |
| GB | 2 061 594 | 5/1981 | | |
| JP | 3-187034 A | * 8/1991 | ............. | 369/275.5 |
| JP | 04-254927 | 9/1992 | | |
| JP | 08-194968 | 7/1996 | | |
| JP | 10-289489 | 10/1998 | | |
| JP | 10-302310 | 11/1998 | | |
| JP | 11-192648 | 7/1999 | | |

* cited by examiner

*Primary Examiner*—Tan Dinh
(74) *Attorney, Agent, or Firm*—Oblon, Spivak, McClelland, Maier & Neustadt, P.C.

(57) ABSTRACT

In an optical information medium comprising a supporting substrate, an information recording layer thereon, and a light-transmitting layer wherein a recording/reading laser beam enters the recording layer through the light-transmitting layer, the light-transmitting layer is formed of a resin and has a tensile strength at break of 5–40 MPa, a tensile elongation at break of 15–100%, and a tensile modulus of $40 \geq 1,000$ MPa. The medium has improved recording/reading characteristics when a laser beam defines a beam spot having a small diameter of up to 300 μm and the medium is rotated at a high linear velocity of at least 8 m/s.

14 Claims, 2 Drawing Sheets

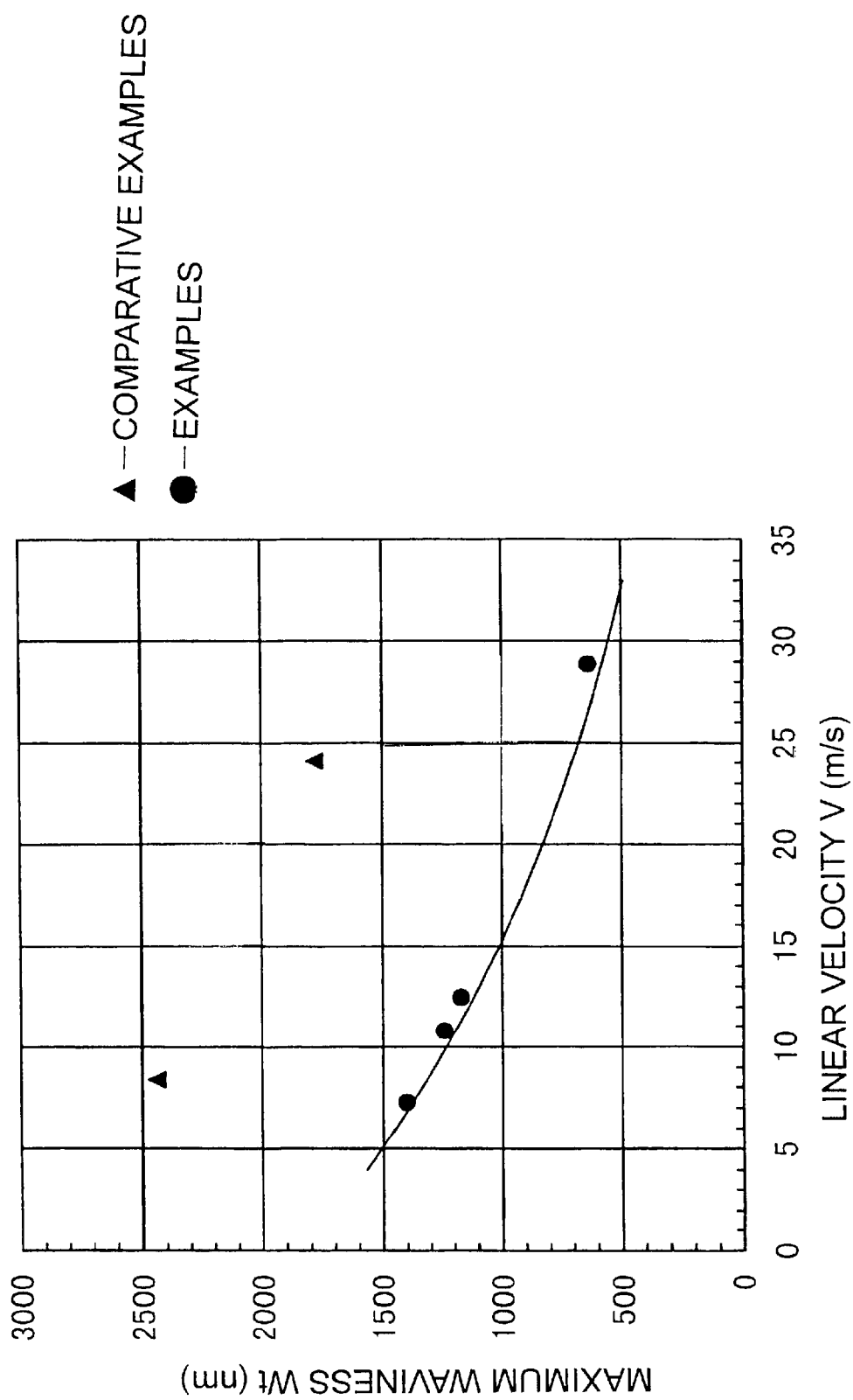

OPTICAL STORAGE MEDIUM HAVING A SPECIFIC LIGHT TRANSMITTING LAYER FOR SMALL LASER BEAM AND HIGH LINEAR VELOCITY

This invention relates to optical information media such as read-only optical disks and optical recording disks, a method for preparing the same, a method for performing recording or reading on the same, and a method for inspecting the same.

BACKGROUND OF THE INVENTION

To record and store a vast quantity of information as typified by moving image information, advanced optical information media such as read-only optical disks and optical recording disks are required to increase their recording density for increasing the capacity. To meet such a demand, engineers have been engaged in the research and development works targeting a higher recording density.

One such approach relating to digital versatile disks (DVD) is to shorten the wavelength of a recording/reading laser beam and increase the numerical aperture (NA) of a recording/reading optical system objective lens, thereby reducing the spot diameter of the recording/reading laser beam. As compared with CD, DVD is successful in achieving a recording capacity of 6 to 8 folds (typically 4.7 GB/side) by changing the recording/reading wavelength from 780 nm to 650 nm and the NA from 0.45 to 0.6.

For long-term recording of moving images of quality, an attempt was recently made to achieve a recording capacity of at least 4 folds of that of DVD, i.e., at least 20 GB/side, by reducing the recording/reading wavelength to about 400 nm and increasing the NA of the objective lens to about 0.85.

Increasing the NA, however, leads to a reduced tilt margin. The tilt margin is a permissible tilt of an optical recording medium relative to an optical system, which depends on the NA. The tilt margin is in proportion to $$\lambda/(t \cdot NA^3)$$

wherein $\lambda$ denotes the wavelength of recording/reading beam and "t" denotes the thickness of a transparent substrate the recording/reading beam enters. If the optical recording medium is inclined or tilted relative to the laser beam, a wavefront aberration (or coma) occurs. The coefficient of wavefront aberration is represented by $$(\tfrac{1}{2}) \cdot t \cdot \{n^2 \cdot \sin\theta\} \cdot \cos\theta \cdot NA^3/(n^2-\sin^2\theta)^-$$

wherein n denotes the refractive index of the substrate and $\theta$ is a tilt angle. It is appreciated from these formulae that the tilt margin may be increased and the occurrence of comatic aberration be suppressed by reducing the thickness "t" of the substrate. In fact, the DVD design is such that a tilt margin is secured by reducing the thickness of the substrate to about one half (about 0.6 mm) of the thickness (about 1.2 mm) of the CD substrate.

To record moving images of better quality for a longer period of time, there has been proposed a structure allowing for use of a thinner substrate. In this structure, a substrate of an ordinary thickness is used as a supporting substrate for maintaining rigidity, pits or a recording layer is formed on the surface of the supporting substrate, and a light-transmitting layer of about 100 µm thick is formed thereon as a thin substrate. Recording/reading beam reaches the pits or recording layer through the light-transmitting layer. This structure can achieve a higher recording density due to a higher NA because the substrate can be made extremely thin as compared with the prior art. One typical medium having such structure is disclosed in JP-A 10-289489. The medium is described therein as having a light-transmitting layer of photo-curable resin.

When the light-transmitting layer is formed of photo-curable resins such as UV-curable resins, however, the media can deflect due to shrinkage upon curing. Deflection can also occur when the media are stored in a hot humid environment. Once the media deflect, frequent errors can occur upon reading, and excessive deflection can cause the media to be unreadable.

JP-A 8-194968 describes an optical disk having a protective coat of resin. In this patent publication, use of the protective coat having a tensile elongation at break of at least 15% prevents the optical disk from deflection during storage in a hot humid environment. It is not described in this patent publication that a recording/reading beam is passed through the protective coat.

The inventors found that when a recording/reading beam is passed to the recording layer through a light-transmitting layer (or protective coat) of approximately 100 µm thick, satisfactory recording/reading characteristics are not obtained merely by setting the tensile elongation at break of the light-transmitting layer at 15% or higher. Problems arise particularly when the diameter of a beam spot of a laser beam is reduced and recording and reading is performed at a high linear velocity. The most serious problem is that the focusing servo loses some stability. Another problem is an increased birefringence.

By reducing the recording/reading wavelength, increasing the NA of the objective lens to reduce the beam spot diameter, and increasing the linear velocity during recording and reading, there can be achieved a significant improvement in data transfer rate. Even a data transfer rate of 100 Mbps or higher is possible. With the start of the satellite digital broadcasting system at the end of 2000, image information of high quality is now delivered to home. A remarkable improvement in data transfer rate is thus demanded for recording such image information.

However, the focusing servo stability must be improved before the data transfer rate can be increased.

SUMMARY OF THE INVENTION

An object of the invention is to an optical information medium comprising a supporting substrate, an information recording layer thereon, and a light-transmitting layer thereon wherein a recording or reading laser beam enters the recording layer through the light-transmitting layer, in which recording/reading characteristics are improved when the beam spot of a laser beam has a small diameter and the linear velocity is high.

The above and other objects are achieved by the present invention defined below.

(1) An optical information medium comprising a supporting substrate, an information recording layer thereon, and a light-transmitting layer on the information recording layer wherein a recording or reading laser beam enters the information recording layer through the light-transmitting layer, said light-transmitting layer is formed of a resin and has a tensile strength at break of 5 to 40 MPa, a tensile elongation at break of 15 to 100%, and a tensile modulus of 40 to 1,000 MPa.

(2) The optical information medium of (1) wherein said light-transmitting layer has a thickness of 30 to 200 µm.

(3) An optical information medium comprising a supporting substrate, an information recording layer thereon, and a light-transmitting layer on the information recording layer wherein a recording or reading laser beam enters the information recording layer through the light-transmitting layer, said light-transmitting layer in an information recording region has a birefringence in absolute value of up to 20 nm at a wavelength of 630 nm and a birefringence distribution breadth of up to 20 nm at a wavelength of 630 nm.

(4) An optical information medium comprising a supporting substrate, an information recording layer thereon, and a light-transmitting layer on the information recording layer wherein a recording or reading laser beam enters the information recording layer through the light-transmitting layer, said light-transmitting layer has a surface reflectivity of up to 10% at the wavelength of the recording or reading laser beam.

(5) An optical information medium comprising a supporting substrate, an information recording layer thereon, and a light-transmitting layer on the information recording layer wherein a recording or reading laser beam enters the information recording layer through the light-transmitting layer, R/F is up to 10% wherein R is a residual error component of a focus error signal at a linear velocity during recording or reading and F is a peak-to-peak value of a focus sensitivity curve.

(6) An optical information medium comprising a supporting substrate, an information recording layer thereon, and a light-transmitting layer on the information recording layer wherein a recording or reading laser beam enters the information recording layer through the light-transmitting layer, wherein said medium satisfies $Wt \leq 1840e^{-0.04V}$ wherein said light-transmitting layer at its surface has a maximum waviness Wt (in nm) and said medium is moved at a linear velocity V (in m/s) during recording or reading, with the proviso that the recording or reading laser beam defines on the surface of said light-transmitting layer a beam spot having a diameter of up to 300 $\mu$m, (7) The optical information medium of (6) wherein said light-transmitting layer includes a light-transmitting sheet formed of a resin and an adhesive layer which joins the light-transmitting sheet to the supporting substrate side, said adhesive layer comprising a cured product of a UV-curable resin and having an average thickness of 0.5 $\mu$m to less than 5 $\mu$m.

(8) The optical information medium of (6) or (7) wherein said light-transmitting layer includes a light-transmitting sheet formed of a resin and an adhesive layer which joins the light-transmitting sheet to the supporting substrate side, said light-transmitting sheet being constructed from a polycarbonate, polyarylate or cyclic polyolefin by a casting technique.

(9) The optical information medium of any one of (3) to (8) which is to be operated at a linear velocity of at least 8 m/s.

(10) The optical information medium of any one of (3) to (9) on which recording or reading is performed by a system including an objective lens having a numerical aperture NA and emitting a recording or reading beam having a wavelength of $\lambda$ wherein $\lambda/NA \leq 780$ nm.

(11) The optical information medium of any one of (3) to (10) which is the optical information medium of (1) or (2).

(12) A method for preparing the optical information medium of any one of (6) to (8), in which said light-transmitting layer includes a light-transmitting sheet formed of a resin and an adhesive layer which joins the light-transmitting sheet to the supporting substrate side, said adhesive layer being comprised of a cured product of a UV-curable resin, said method comprising the step of irradiating UV radiation to a coating of the UV-curable resin for curing the resin to form said adhesive layer, the UV radiation irradiated having an energy density of up to 1,000 mW/cm$^2$.

(13) In connection with an optical information medium comprising a supporting substrate, an information recording layer thereon, and a light-transmitting layer on the information recording layer, wherein said light-transmitting layer has a birefringence in absolute value of up to 20 nm at a wavelength of 630 nm and a birefringence distribution breadth of up to 20 nm at a wavelength of 630 nm, a recording or reading method wherein recording or reading is performed by passing a recording or reading laser beam to said information recording layer through said light-transmitting layer.

(14) In connection with an optical information medium comprising a supporting substrate, an information recording layer thereon, and a light-transmitting layer on the information recording layer having a surface reflectivity of up to 10% at a recording or reading wavelength.

a recording or reading method wherein recording or reading is performed by passing a recording or reading laser beam to said information recording layer through said light-transmitting layer.

(15) A method for inspecting optical information media comprising a supporting substrate, an information recording layer thereon, and a light-transmitting layer on the information recording layer wherein a recording or reading laser beam enters the information recording layer through the light-transmitting layer, said method comprising selecting those optical information media in which R/F is up to 10% wherein R is a residual error component of a focus error signal at a linear velocity during recording or reading and F is a peak-to-peak value of a focus sensitivity curve.

FUNCTION AND RESULTS

In an optical information medium in which information is read by way of a light-transmitting layer of about 100 $\mu$m thick, the present invention controls the tensile strength at break, tensile elongation at break and tensile modulus of the light-transmitting layer to specific ranges, respectively. The light-transmitting layer having specific physical properties has a reduced birefringence and a reduced birefringence distribution breadth, and serves to reduce the deflection and axial runout of the medium.

Because of the reduced deflection and reduced axial runout, especially because of the minimized axial runout, the medium undergoes a reduced axial runout acceleration when the linear velocity is increased. As a result, the residual error component (R) of a focus error signal at the increased linear velocity is 10% or less of the peak-to-peak value (F) of a focus sensitivity curve, whereby the focusing servo error at the increased transfer rate is reduced.

It is noted that no direct correlation exists between the deflection and the axial runout of the medium. A medium having a large deflection quantity tends to have a large axial runout quantity. However, a disk-shaped medium which has deflected like an umbrella, for example, experiences little increase of axial runout. On the other hand, a disk-shaped medium which has deflected while being twisted will undergo a large quantity of axial runout even when the deflection quantity measured is small.

Although it has not been proposed in the art to utilize R/F as the criterion for judging the focusing servo performance, the inventors have found that reducing R/F, specifically reducing R/F to 10% or below provides a great contribution to a reduction of jitter upon reading and to the prevention of writing errors. By measuring R/F at the linear velocity used for recording or reading (referred to as "operating linear velocity"), it can be judged whether or not recording and reading with high reliability is possible on the medium at the operating linear velocity. Therefore, the measurement of R/F can be utilized in the inspection of the medium. It is understood that the focusing servo does not fail even at R/F in excess of 10%.

In the medium of the invention, the utilization efficiency of light is increased on account of the reduced birefringence, which results in an increased read signal output.

It is understood that for a resin layer such as a light-transmitting layer, no direct correlation exists among tensile strength at break, tensile elongation at break and tensile modulus.

BRIEF DESCRIPTION OF THE DRAWINGS

FIG. 2 is a graph of the maximum waviness Wt on the light-incident surface of the medium versus the maximum linear velocity Vmax at which the ratio R/F of the residual error component (R) of focus error signals to the peak-to-peak value (F) of a focus sensitivity curve do not exceed

DESCRIPTION OF THE PREFERRED EMBODIMENTS

Figure 1:
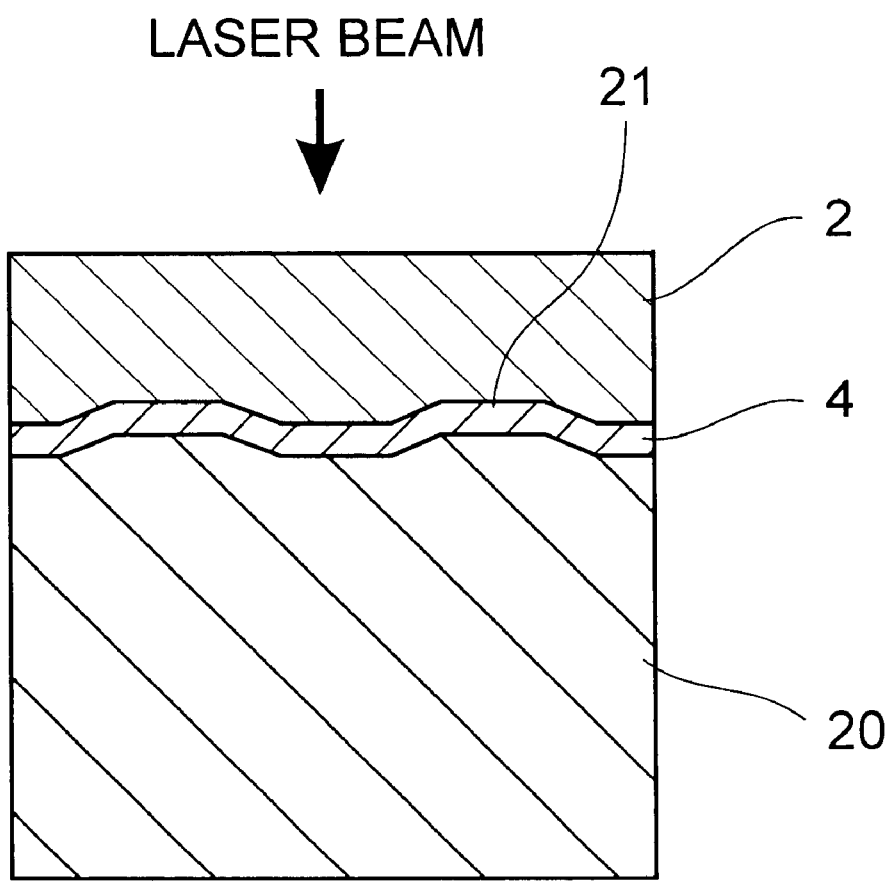
FIG. 1 is a fragmentary cross-sectional view of an optical information medium.

Referring to FIG. 1, there is illustrated one exemplary construction of the optical information medium of the invention. This optical information medium is a recording medium including a supporting substrate 20, an information recording layer in the form of a recording layer 4 on the supporting substrate 20, and a light-transmitting layer 2 on the recording layer 4. A laser beam for recording or reading is passed to the recording layer 4 through the light-transmitting layer 2.

The invention is applicable to any type of recording layer. Specifically, the invention is applicable to phase change recording media, pit formation type recording media, and magneto-optical recording media, for example. In general, additional layers such as a dielectric layer and a reflective layer are provided on at least one side of the recording layer for the purposes of protecting the recording layer and achieving optical effects, although they are omitted in FIG. 1. The invention is not limited to the recordable type as in the illustrated embodiment, and may also be applicable to the read-only type. In the latter case, the supporting substrate 20 having pits formed integrally therein is used, and a reflective layer in the form of a metal film, metalloid film or multilayer dielectric film is formed thereon. The pattern of pits is transferred to the reflective layer whereby the reflective layer constitutes the information recording layer.

Now the respective components of the inventive medium are described in detail.

The supporting substrate 20 is provided to maintain rigidity for the medium. The supporting substrate generally has a thickness of 0.2 to 1.2 mm, preferably 0.4 to 1.2 mm and may be either transparent or opaque. The supporting substrate 20 is usually constructed of a resin like conventional optical recording media although glass may also be used for the substrate. Grooves or guide channels 21, which are generally formed in optical recording media, are obtained by forming grooves in the supporting substrate 20 and transferring the grooves to the layers deposited thereon. The grooves 21 are (depressed) regions located closer to the incident side of recording/reading laser beam, while strip-like raised regions interposed between adjacent grooves serve as lands.

The light-transmitting layer 2 has a sufficient transparency for laser beam to pass therethrough. The light-transmitting layer preferably has a thickness in the range of from 30 $\mu$m to 200 $\mu$m, more preferably from more than 50 $\mu$m to 200 $\mu$m and most preferably from 70 $\mu$m to 150 $\mu$m. If the light-transmitting layer is thinner than the range, dust depositing thereon can have detrimental optical effects. Under the situation that the distance between the optical pickup and the medium is reduced as a result of the increased NA, so that the optical pickup can frequently contact the medium surface, a thinner light-transmitting layer fails to provide a sufficient protective effect against contact with the optical pickup. If the light-transmitting layer is too thick, it may be difficult to achieve a high recording density by an increase of NA. It is noted that a thick light-transmitting layer can undergo substantial shrinkage upon curing and as a result, the medium has a greater deflection. However, since the light-transmitting layer used herein has a low tensile modulus and a high tensile elongation at break, it undergoes minimized deflection upon curing even if it is as relatively thick as having a thickness of more than 50 $\mu$m, and even no less than 70 $\mu$m. The deflection, even once incurred upon curing, will mitigate with the lapse of time. This results in a medium having minimized deflection and axial runout which has never found in the art.

In one embodiment, the light-transmitting layer 2 has a tensile strength at break of up to 40 MPa, preferably up to 35 MPa, a tensile elongation at break of at least 15%, preferably at least 20%, and a tensile modulus (or modulus in tension) of up to 1,000 MPa, preferably up to 800 MPa. If the tensile strength at break is too high, the layer may have a larger birefringence and larger birefringence distribution breadth. If the tensile elongation at break is too low, the medium may have a larger axial runout and tends to deflect, especially during storage under severe conditions, typically hot humid conditions. If the tensile modulus is too high, the medium tends to deflect and may have a larger axial runout.

Inversely, if the tensile strength at break of the light-transmitting layer is too low, the desired effect of the light-transmitting layer, that is, the effect of protecting the information recording layer becomes insufficient, and the quantity of deflection is rather increased. For this reason, the tensile strength at break is at least 5 MPa, preferably at least 7 MPa. If the tensile elongation at break of the light-transmitting layer is too high, the light-transmitting layer is too soft and insufficient in strength. Even when a surface layer having a higher strength is formed thereon, no satisfactory protective effect is achievable. For this reason, the tensile elongation at break is up to 100%, preferably up to 80%. If the tensile modulus of the light-transmitting layer is too low, the quantity of deflection is rather increased and the light-transmitting layer becomes too soft. For this reason, the tensile modulus is at least 40 MPa.

It is noted that the tensile strength at break, tensile elongation at break and tensile modulus used herein is as prescribed in JIS K-7127 (1989). Upon measurement, parameters are set to:

specimen length: 60 mm,
specimen width: 10 mm,
distance between two gage marks: 40±1 mm,
distance between grips: 44±1 mm, and
separation rate: 30 mm/min,
and the remaining measurement conditions are as prescribed in JIS K-7127 (1989). The described parameters differ from those of JIS K-7127 (1989) because the size of the medium (usually a diameter of about 12 cm for an optical disk) is taken into account so that measurement may be made on the light-transmitting layer peeled from the medium.

The adjustment of the tensile strength at break, tensile elongation at break and tensile modulus in the above-defined ranges makes it possible to reduce the birefringence and distribution breadth thereof, to reduce the deflection of the medium immediately after manufacture, to prevent the medium from deflecting during storage in a hot humid environment, and to reduce the axial runout of the medium.

More illustratively, it becomes easily possible that the light-transmitting layer have a birefringence in absolute value of up to 20 nm, especially up to 18 nm, at a wavelength of 630 nm. It also becomes easily possible that the light-transmitting layer have a birefringence distribution breadth of up to 20 nm, especially up to 15 nm, in peak-to-peak value, at a wavelength of 630 nm. It is noted that smaller birefringence and distribution breadth thereof are more preferable. However, it is unnecessary to reduce the birefringence below 2 nm and to reduce the distribution breadth of birefringence below 2 nm since the effect is not remarkably increased by remarkably reducing birefringence and distribution breadth thereof. The birefringence and distribution breadth thereof used herein are values in the information recording region. More particularly, in the case of an optical disk, for example, they are values in the region of the disk excluding the regions (inner and outer peripheral regions) not serving as the information recording region. It is noted that the birefringence and distribution breadth thereof prescribed herein are measurements at a wavelength of 630 nm although the invention does not limit the wavelength of a recording or reading beam to 630 nm. When the birefringence and distribution breadth thereof at a wavelength of 630 nm are as low as the above-defined ranges, effects including light utilization efficiency-improving effect are achievable over a wide wavelength region ranging from about 250 nm to about 900 nm.

Even at a high linear velocity at which the axial runout acceleration becomes so high that focusing servo errors may frequently occur, for example, a linear velocity of at least 8 m/s, especially 10 to 35 m/s, the occurrence of focusing servo errors can be fully suppressed. More particularly, provided that R is a residual error component of a focus error signal and F is a peak-to-peak value of a focus sensitivity curve, it becomes easily possible that R/F be up to 10%, and especially up to 6%. It is noted that smaller values of R/F are more preferable. However, it is unnecessary to reduce the R/F below 0.1% since the effect is not remarkably increased by remarkably reducing the R/F.

In a preferred embodiment of the invention, the light-transmitting layer has a surface reflectivity of up to 10% at a recording and reading wavelength. Setting the surface reflectivity at 10% or lower is effective particularly at a high linear velocity entailing a less efficient utilization of laser energy, for example, at a linear velocity of at least 8 m/s, especially 10 to 35 m/s. It is noted that smaller values of surface reflectivity are more preferable. However, it is unnecessary to reduce the surface reflectivity below 0.1% since the effect is not remarkably increased by remarkably reducing the surface reflectivity.

The advantages of the invention becomes more outstanding when recording or reading is performed by a system including an objective lens having a numerical aperture NA and emitting a recording or reading beam having a wavelength of $\lambda$ wherein $\lambda/NA \leq 780$ nm, and especially $\lambda/NA \leq 680$ nm. That is, the medium of the invention is more effective when a recording/reading beam having a relatively short wavelength is passed through an objective lens having a large numerical aperture. It is noted that the medium is generally acceptable if satisfactory recording/reading characteristics are available in the range of 400 nm $\leq \lambda/NA$.

The invention is characterized in that the light-transmitting layer has a tensile strength at break, a tensile elongation at break and a tensile modulus in the above-defined ranges, whereby the above-described benefits are achievable. Therefore, the construction of the resin of which the light-transmitting layer is formed and the method of forming the light-transmitting layer are not critical. Included are a method of applying a resin or a composition which will cure to form a resin, followed by optional curing, and a method of joining a previously formed resin sheet with a UV-curable adhesive or pressure-sensitive adhesive. In order to obtain a light-transmitting layer having a tensile strength at break, a tensile elongation at break and a tensile modulus in the above-defined ranges, it is preferred that the light-transmitting layer be formed by applying an active energy radiation-curable resin by a spin coating technique, and exposing the coating to active energy (actinic) radiation such as UV radiation for curing.

The actinic radiation-curable resin composition used herein generally contains at least one of mono- or polyfunctional monomers, oligomers and polymers, a polymerization initiator, photopolymerization initiator aid, polymerization inhibitor and other additives. Such a composition may be selected, for example, from the compositions for protective coat on high-density optical disks described in the above-referred JP-A 8-194968. The preferred composition used herein is one comprising at least a linear difunctional oligomer having functional groups at opposite ends and a monofunctional monomer. If the content or molecular weight of the difunctional oligomer is too low, then the tensile elongation at break after curing becomes small. As the ratio of the monofunctional monomer to the difunctional oligomer increases, the tensile strength at break can be reduced without a substantial loss of the tensile elongation at break after curing. Also, the addition of the monofunctional monomer improves the adhesion between the light-transmitting layer and the surface on which it is formed. It is noted that if the content of the monofunctional monomer is too high, the tensile elongation at break after curing becomes small. Therefore, the content and molecular weight of the difunctional oligomer and the content of the monofunctional monomer may be selected as appropriate depending on the physical properties of the light-transmitting layer required in the present invention. It is understood that such a composition may be selected from commercially available ones.

Given below are examples of suitable oligomers and monomers used in the actinic radiation-curable resin composition.

Suitable difunctional oligomers include polyester acrylates, epoxy acrylates and urethane acrylates. The polyester acrylates are available under the trade name of Aronix M-6200, Aronix M-6400X, Aronix M-6410X and Aronix M-6420X from Toa Gosei Co., Ltd. The epoxy acrylates are available under the trade name of Lipoxy SP-1506, Lipoxy SP-1509, Lipoxy SP-1519-1, Lipoxy SP-1563, Lipoxy VR-77, Lipoxy VR-60 and Lipoxy VR-90 from Showa Highpolymer Co., Ltd.; Biscoat 540 from Osaka Yukikagaku Co., Ltd.; Kayarad R-167 from Nippon Kayaku Co., Ltd.; Epoxy Ester 3002A, Epoxy Ester 3002M and Epoxy Ester 80MFA from Kyoeisha Yushi Co., Ltd.; and Nadecole DM-851, Nadecole DA-811, Nadecole DM-811, Nadecole DA-721 and Nadecole DA-911 from Nagase & Co., Ltd. The urethane acrylates are available under the trade name of Art Resin UN-1000PEP, Art Resin UN-9000PEP, Art Resin UN-9200A, Art Resin UN-2500, Art Resin UN-5200, Art Resin UN-1102, Art Resin UN-380G, Art Resin UN-500 and Art Resin UN-9832 from Negami Chemical Industrial Co., Ltd.; Aronix M-1200 from Toa Gosei Co., Ltd.; and Chemlink 9503, Chemlink 9504 and Chemlink 9505 from Sartomer Co.

Examples of the monofunctional monomer include benzyl acrylate, benzyl methacrylate, butoxyethyl acrylate, butoxyethyl methacrylate, butane diol monoacrylate, cyclohexyl acrylate, cyclohexyl methacrylate, dicyclopentanyl acrylate, dicyclopentanyl methacrylate, alicyclically modified neipentyl glycol acrylate, dicyclopentenyl acrylate, dicyclopentenyloxyethyl acrylate, dicyclopentenyloxyethyl methacrylate, 2-ethoxyethyl acrylate, 2-ethoxyethyl methacrylate, 2-ethylhexyl acrylate, 2-ethylhexyl methacrylate, glycidyl acrylate, glycidyl methacrylate, 2-hydroxyethyl acrylate, 2-hydroxyethyl methacrylate, 2-hydroxypropyl acrylate, 2-hydroxypropyl methacrylate, isobornyl acrylate, isobornyl methacrylate, isodecyl acrylate, isodecyl methacrylate, isooctyl acrylate, isooctyl methacrylate, lauryl acrylate, lauryl methacrylate, 2-methoxyethyl acrylate, methoxydiethylene glycol methacrylate, methoxyethylene glycol acrylate, morpholine acrylate, phenoxyhydroxypropyl acrylate, phenoxyethyl acrylate, phenoxyethyl methacrylate, phenoxydiethylene glycol acrylate, EO-modified phthalic acid acrylate, EO-modified phthalic acid methacrylate, stearyl acrylate, stearyl methacrylate, tetrahydrofurfuryl acrylate, tetrahydrofurfuryl methacrylate, vinyl acetate, and N-vinylpyrrolidone.

The preferred actinic radiation-curable resin composition used herein has a relatively high viscosity, typically in the range of about 1,000 to 30,000 centipoise at 25° C. In contrast, the above-referred JP-A 8-194968 discloses that the composition preferably has a viscosity of 5 to 300 centipoise at 25° C.

The above-referred JP-A 8-194968 describes that the protective coat on the optical disk has a tensile elongation at break of at least 15%, which is effective for restraining the occurrence of deflection of the optical disk during storage in a hot humid environment. The range of tensile elongation at break described in said patent publication overlaps the range defined in the present invention. However, since the protective coat-forming composition described in said patent publication differs in viscosity from the composition used in the present invention as mentioned just above, it is not believed that the light-transmitting layer resulting from curing of the composition described in said patent publication has the physical properties of the light-transmitting layer defined in the present invention. It is merely described in said patent publication that a protective coat of 1 to 50 μm thick is formed in order to protect the recording portion from corrosion, but not that a recording and reading beam enters the recording portion through the protective coat. It is thus evident that said patent publication does not intend to reduce the birefringence of the protective coat. In contrast, it is important for the present invention to reduce the deflection quantity of the medium to a remarkably low level and to reduce the birefringence and distribution breadth thereof to remarkably low levels in order that a recording/reading beam of a relative short wavelength enter the recording layer through the thin light-transmitting layer of about 100 μm thick. The above-referred patent publication describes that the deflection is reduced, but does not refer to axial runout and axial runout acceleration. It is substantially impossible to form a light-transmitting layer having a thickness in excess of 50 μm using a composition having a low viscosity as described in said patent publication.

The light-transmitting layer used herein may be a laminate of two or more resin layers. One exemplary laminate type is a structure in which an inner layer having a low tensile strength at break and a high tensile elongation at break and a surface layer having higher wear resistance than the inner layer lying on the inner layer, the surface layer constituting the surface of the light-transmitting layer. This structure allows the surface layer to be thin because satisfactory wear resistance is obtained even when the surface layer is considerably thinner than the inner layer. Then, the requirement relating to physical properties is not so rigorous for the material of which the surface layer is formed. Accordingly, for the material of which the surface layer is formed, a relatively free choice may be made of a resin having good wear resistance among numerous resins. Understandably, the surface layer desirably has a higher tensile strength at break than the inner layer, specifically a tensile strength at break of more than 40 MPa.

It is preferred that the inner and surface layers in the above-described structure be cured products of actinic radiation-curable resin compositions as mentioned above. For the composition used to form the inner layer, one that will have a low tensile strength at break, a high tensile elongation at break and a low tensile modulus after curing is selected. For the composition used to form the surface layer, on the other hand, the proportion of polyfunctional oligomer and/or polyfunctional monomer is preferably set relatively high whereby the surface layer has a higher hardness. A relatively high proportion of monofunctional monomer improves the adhesion between the surface layer and the inner layer.

In the two-layer structure of surface and inner layers, the surface layer preferably has a thickness of 0.1 to 10 μm, more preferably 0.3 to 5 μm. If the surface layer is too thin, the protective effect may become insufficient. Inversely, if the surface layer is too thick, it may become difficult to control the physical properties of the entire light-transmitting layer so as to fall within the range specified herein.

It is noted that the inner layer may have a multilayer structure consisting of two or more plies.

In the embodiment wherein the light-transmitting layer has a multilayer structure formed of actinic radiation-curable resins, it is customary that a lower layer-forming composition is applied and cured before an upper layer-forming composition is applied and cured. To improve the adhesion between lower and upper layers, a procedure of laying the upper layer on the lower layer which has been semi-cured, and completely curing all the layers at last may be employed.

As previously described, the ratio R/F of the residual error component R of a focus error signal to the peak-to-peak value F of a focus sensitivity curve can be utilized for the inspection of the optical information medium. It is noted that the same medium can have different R/F ratios depending on the operating linear velocity. Seeking for the parameter to be controlled in accordance with the operating linear velocity in order that R/F fall within the preferred range, the inventors have found that R/F is substantially affected by the maximum waviness on the surface of the light-transmitting layer. More specifically, it has been found that the relationship:

$$Wt \leq 1840e^{-0.04V}$$

should preferably be met, provided that the light-transmitting layer at its surface has a maximum waviness Wt (in nm) and the medium is rotated at a linear velocity V (in m/s) during recording or reading. Note that e is the base of natural logarithm. By forming the light-transmitting layer so that the maximum waviness Wt may fall in the above range in accordance with the operating linear velocity V, there can be realized a medium that entails minimized focusing servo errors. It is noted that smaller Wt is more preferable, but the effect is not remarkably improved by reducing Wt to a remarkably low level. Then, in most cases, it suffices that Wt be:

$$Wt \geq 10 \text{ nm}.$$

It is noted that the maximum waviness Wt used herein is prescribed in ANSI B46.1. Upon measurement of the maximum waviness Wt of the light-transmitting layer, parameters are set to:

high-pass filter: 0.2 mm, low-pass filter: 2 mm, evaluated length: 20 mm, reference length: 16 mm, probe pressing force: 10 mg, probe: diamond stylus with curvature radius 12.5 μm, and measuring time: 25 sec, and the remaining measurement conditions are as prescribed in ANSI B46.1.

The influence of Wt on the above-described R/F differs with the beam spot diameter of a recording or reading laser beam. The beam spot diameter used herein is the diameter of the spot that a laser beam defines on the incident surface (light-transmitting layer surface). In a situation wherein the beam spot diameter is large, the R/F is not so increased even when Wt has a relatively large value. Then the relationship of Wt to V prescribed in the present invention stands under the condition that the beam spot diameter is not greater than 300 μm, especially not greater than 200 μm. However, if the beam spot diameter is too small, the influence of surface roughness of the light-transmitting layer becomes substantial. Then the control of Wt according to the invention is preferably applied to the situation wherein the beam spot diameter is 10 μm or larger. The control of Wt is effective where the light-transmitting layer is thin as in the medium of the invention, because the beam spot diameter on the surface of the light-transmitting layer is small. It is noted that the beam spot diameter D on the surface of the light-transmitting layer is represented by $$D=2\tan\{\sin^{-1}(Na/n)\}\cdot t+1.22\lambda/NA$$

wherein the laser beam has a wavelength λ, the laser beam irradiating optical system includes an objective lens having a numerical aperture NA, and the light-transmitting layer has a refractive index "n" at the wavelength λ and a thickness "t." When the beam spot is elliptic, the beam spot diameter is the diameter in the longitudinal direction of recording track.

In the disk-shaped medium, the maximum waviness Wt on the light-transmitting layer surface is not correlated to the deflection and torsion of the medium that are incurred by the above-described mechanism. It is noted that the measurement of Wt sometimes becomes impossible if the medium undergoes too much deflection and torsion.

Since an appropriate value of the maximum waviness Wt varies with the operating linear velocity V, the maximum waviness on the surface of the light-transmitting layer may be controlled in accordance with the operating linear velocity. Where it is necessary for the maximum waviness to conform to a high linear velocity, for example, a linear velocity of at least 8 m/s, especially 10 to 35 m/s, the light-transmitting layer is preferably constructed as described below.

In the embodiment wherein the light-transmitting layer is formed by forming a coating containing a UV-curable resin by a spin coating technique and exposing the coating to UV radiation for curing, the spin coating conditions must be controlled such that no asperities may form on the coating. To this end, it is recommended, for example, that the viscosity of the coating solution is controlled such that no bubbles may be introduced into the coating, or that the coating solution is prepared such that no gel may form in the coating solution.

In the other embodiment wherein the light-transmitting layer consists of a light-transmitting sheet formed of a resin and an adhesive layer for joining the light-transmitting sheet to the supporting substrate side, the adhesive layer containing a cured product of a UV-curable resin, it is preferred that the adhesive layer have an average thickness of from 0.5 μm to less than 5 μm, and especially from 1 μm to 3 μm. Too thin an adhesive layer may absorb a less amount of UV radiation, with which few active species are formed. Also, when curing is performed in air, too thin an adhesive layer leads to a more amount of contact air per unit volume of the adhesive layer, which tends to deactivate active species in the case of resins susceptible to oxygen inhibition (e.g., radical polymerization resins) or resins susceptible to moisture inhibition (e.g., cation polymerization resins). Therefore, the adhesive layer is rather restrained from curing, resulting in an insufficient bonding force. Further, too thin an adhesive layer is difficult to form as a uniform layer. Inversely, if the adhesive layer is too thick, the adhesive layer has a greater thickness distribution and the maximum waviness Wt on the surface of the light-transmitting sheet overlying the adhesive layer becomes larger. It is noted that the average thickness of the adhesive layer is the thickness at a position spaced from the center of the optical disk by one half of the disk radius.

Next, it is described how to form the adhesive layer.

In forming the adhesive layer, a UV-curable resin or a solution thereof is applied to the entire surface on the supporting substrate side (the surface of the recording layer 4 in FIG. 1) to form a coating. To reduce the thickness distribution of the adhesive layer and coating variation, it is preferred that the coating is formed by diluting the UV-curable resin with a solvent to form a resin solution and applying this resin solution. The solvent used in diluting the resin is not critical, and any suitable one may be selected from a variety of solvents such as alcohol, ester, cellosolve and hydrocarbon solvents as long as it does not attack the supporting substrate and the light-transmitting sheet.

The resin solution preferably has a viscosity of less than 10 centipoise, more preferably 4 to 6 centipoise. Too high a viscosity may make it difficult to reduce the thickness distribution of the adhesive layer. Inversely, too low a viscosity may make it difficult to form a uniform adhesive layer. The resin solution preferably has a solid concentration of 10 to 50% by weight, and more preferably 20 to 40% by weight. Too low a solid concentration may make it difficult to form a uniform adhesive layer. Inversely, too high a solid concentration may make it difficult to reduce the thickness distribution of the adhesive layer and to reduce the maximum waviness Wt on the surface of the light-transmitting sheet.

The technique of forming the coating is not critical. There may be employed any of spin coating, spray coating, roll coating, screen coating, die coating, curtain coating, and dip coating techniques. Notably, the spin coating technique has the tendency that the adhesive layer becomes thicker toward the outer periphery of the optical disk; and the roll coating and die coating techniques have the tendency that the adhesive layer differs in thickness between the leading side and the trailing side. The effects resulting from the control in thickness of the adhesive layer become more enhanced with these techniques. Of these coating techniques, the spin coating technique is preferred because it facilitates to form a uniform adhesive layer, causes no damage to the medium on account of non-contact coating, and reduces the surface roughness of the adhesive layer.

After the coating is formed, a light-transmitting sheet is placed thereon, preferably under a subatmospheric pressure. The subatmospheric pressure is below 1 atm., preferably 0.3 atm. or lower, more preferably 0.1 atm. or lower. The placement of a light-transmitting sheet under a subatmospheric pressure prevents bubbles from being introduced into the adhesive layer, thus preventing any tracking servo failure caused by bubbles.

Once the light-transmitting sheet is placed on the coating, the coating is cured by exposing it to UV radiation. UV exposure may use customary high-pressure mercury vapor lamps. Curing may be effected under the subatmospheric pressure or after the vacuum is relieved back to air. Curing under the subatmospheric pressure can alleviate oxygen inhibition and moisture inhibition upon curing.

When the adhesive layer is formed by UV curing, the energy density of UV radiation is preferably set to 1,000 mW/cm$^2$ or less, and especially 600 mW/cm$^2$ or less. By setting the energy density of UV radiation within this range, the maximum waviness Wt on the surface of the light-transmitting sheet bonded to the adhesive layer can be reduced. Even when the adhesive layer has a thickness of 5 μm or more, for example, Wt can be suppressed fully low. It is noted that since too low an energy density of UV radiation requires a too long time for curing and results in short-cure, the energy density of UV radiation is preferably at least 5 mW/cm$^2$.

Suitable materials of which the light-transmitting sheet is made are polycarbonates, polyarylates and cyclic polyolefins.

The polycarbonates used herein are not critical. For example, aromatic polycarbonates of the conventional bisphenol type are useful. Polycarbonate sheets prepared by casting to be described later are commercially available under the trade name of Pure Ace from Teijin Co., Ltd.

The polyarylates are polyesters of dihydric phenols with aromatic dicarboxylic acids. The polyarylates used herein are amorphous ones, with polycondensates of bisphenol A with terephthalic acid being especially preferred. The polyarylates tend to develop birefringence due to the inclusion of aromatic rings like the polycarbonates, but are more resistant to heat than the polycarbonates. Polyarylate sheets prepared by casting to be described later are commercially available under the trade name of Elmec from Kaneka Corp.

The cyclic polyolefins used herein are preferably highly transmissive to light. Such light transmissive cyclic polyolefins are amorphous cyclic polyolefins prepared from norbornene compounds as the starting material. These cyclic polyolefins are also resistant to heat. Commercially available cyclic polyolefins are useful in the practice of the invention. Commercially available cyclic polyolefins are Arton by JSR Co., Ltd., Zeonex by Nippon Zeon Co., Ltd., and Apel by Mitsui Chemical Co., Ltd. Arton and Zeonex are available in the form of sheets. Arton and Zeonex are prepared by effecting ring-opening polymerization of norbornene monomers, followed by hydrogenation. In particular, Arton starts with a norbornene monomer having an ester group on a side chain and is readily soluble in solvents. Arton is advantageous in that it can be formed into sheets by casting. Other advantages of Arton are a high bond strength with the adhesive layer because it is highly bondable with organic materials, and less electrostatic charging leading to less dust attachment.

It is not critical how to prepare the light-transmitting sheet. Since the light-transmitting sheet used herein is thin, it is difficult to form the sheet by conventional injection molding. Consequently, techniques capable of forming resins into sheets such as solvent casting and melt extrusion are preferable. The especially preferred technique is solvent casting. The casting technique is disclosed, for example, in JP-B 3-75944 as the technique capable of forming flexible disk substrates having improved transparency, birefringence, flexibility, surface precision and film thickness uniformity. In the practice of the invention, the casting technique is preferably utilized in forming the light-transmitting sheet.

The process of forming the light-transmitting sheet by the casting technique involves (1) dissolving resin pellets such as polycarbonate pellets in a suitable solvent such as methylene chloride, acrylonitrile or methyl acrylate, (2) thoroughly agitating, deaerating and filtering the solution and then continuously flowing the solution on a mold having a high surface precision through a die, (3) evaporating the solvent by passing through a drying furnace, and (4) continuously winding up the sheet into a roll.

The light-transmitting sheet formed by the casting technique has a reduced birefringence since it has experienced less tension during manufacture, as compared with the sheet formed by a conventional melt extrusion technique which inevitably develops a distribution of birefringence in a stretched direction. Also, the casting technique can form a sheet of uniform thickness having an excellent surface state by properly controlling the rate of evaporation of the solvent. Additionally, the casting technique eliminates flaws by die lines as found in the melt extruded sheet. Additionally, the sheet formed by the flow casting technique has the advantage of reduced maximum waviness Wt on its surface, for example, a fully reduced value of Wt even when the adhesive layer has a thickness of at least 5 μm.

It can be confirmed by an isotropic pattern of birefringence whether or not a particular light-transmitting sheet has been formed by the casting technique. The same can also be confirmed by qualitative analysis of the residual solvent in the sheet by gas chromatography or the like.

EXAMPLE

Examples of the invention are given below by way of illustration and not by way of limitation.

Example 1

Optical recording disk samples were fabricated as follows.

There were furnished disk-shaped supporting substrates (polycarbonate, diameter 120 mm, thickness 1.2 mm) having grooves formed therein. The grooves had a depth of λ/6 as expressed by optical path length at the wavelength λ of 405 nm. In the land-groove recording system, the recording track pitch was 0.3 μm. On the grooved surface of the substrates, a reflective layer of $Al_{98}Pd_1Cu_1$ (atomic ratio) was formed by sputtering.

On the surface of the reflective layer, a second dielectric layer of 20 nm thick was formed by sputtering an $Al_2O_3$ target.

Next, on the surface of the second dielectric layer, a recording layer of 12 nm thick was formed by sputtering an alloy target of phase change material. The recording layer had the composition of $Sb_{74}Te_{18}(Ge_7In_1)$ in atomic ratio.

Next, on the surface of the recording layer, a first dielectric layer of 130 nm thick was formed by sputtering a target of 80 mol % ZnS-20 mol % $SiO_2$.

Next, on the surface of the first dielectric layer, an inner layer of 97 μm thick was formed by spin coating a UV-curable resin (SSP50U10 by Showa Highpolymer Co., Ltd., viscosity 1,900 centipoise at 25° C.) and exposing the coating to UV radiation. Then another UV-curable resin (MH-7361 by Mitsubishi Rayon Co., Ltd.) was spin coated on the inner layer and exposed to UV radiation, forming a surface layer of 3 μm thick. This resulted in a light-transmitting layer of 100 μm thick.

The recording layer of the thus fabricated optical recording disk sample was initialized or crystallized by means of a bulk eraser. Using Biref 126P by Dr. Schenk, the birefringence of the light-transmitting layer in the information recording region (the region ranging from a radius 23 mm to a radius 58 mm of the disk sample) was measured while a laser beam with wavelength 630 nm was directed to the recording layer from the light-transmitting layer side. The maximum in absolute value of birefringence and the difference between the maximum and the minimum (distribution breadth) were determined. The results are shown in Table 1.

Also the surface reflectivity of the light-transmitting layer of this sample was measured by the following process. First, the light-transmitting layer was formed on the surface of a glass substrate having the same size as the supporting substrate by the above-described procedure. The light-transmitting layer was stripped from the glass substrate. The reflectivity of the light-transmitting layer at a wavelength of 405 nm was measured using a 45° absolute specular reflectivity meter attached to a spectrophotometer MPS-2000 by Shimadzu Corp. The results are shown in Table 1.

This disk sample was mounted on an optical recording medium tester. Signals were recorded in lands and grooves under the following conditions.

laser wavelength: 405 nm numerical aperture NA: 0.85 linear velocity: 11.4 m/s recording signals: 1–7 modulation signals (shortest signal length 2T)

Then the recorded signals were read out, during which a jitter was determined. The results are shown in Table 1. The jitter is a clock jitter determined by analyzing the read signals by a time interval analyzer and computing according to $$\sigma/Tw(\%)$$

wherein Tw is the window margin. If the jitter is up to 13%, errors fall within the permissible range. To provide satisfactory ranges of various margins, the jitter is desirably up to 10%, and more desirably up to 9%.

The ratio of a residual error component of a focus error signal to a peak-to-peak value of a focus sensitivity curve was determined as follows. The sample was mounted on a measuring device where it was rotated at a linear velocity of 11.4 m/s. Next, with the focusing servo kept inoperative, focus error signals were detected while the distance between the sample and the optical pickup was changed. A focus sensitivity curve was obtained by plotting the focus error signal output as a function of the positional change of the sample. The focus sensitivity curve is known as S-shaped curve and described, for example, in "Optical Disk Technology," Feb. 10, 1989, Radio Gijutsu K.K., page 81. From the focus sensitivity curve, the peak-to-peak value of focus error signal outputs, that is, the difference between the peak value of positive outputs and the peak value of negative outputs was determined. Next, the focusing servo was made operative, the output peak-to-peak value of residual error components of focus error signals was measured. It is noted that in this measurement, the focusing servo depended on the knife edge method. From the thus obtained peak-to-peak value F of the focus sensitivity curve and the peak-to-peak value R of the residual error component of focus error signals, R/F was computed. The results are shown in Table 1.

The focusing servo method used in determining the ratio of the residual error component of a focus error signal to the peak-to-peak value of a focus sensitivity curve is not particularly limited and may be selected from the knife edge method, astigmatism method and the like.

Next, the light-transmitting layer of the sample was cut by a cutter knife to rectangular strips of 60 mm×10 mm. Using Tensilon Model TRM-100 by Orientec K.K., the test strip was measured for tensile strength at break, tensile elongation at break and tensile modulus under the measuring conditions prescribed in JIS K-7127 (1989) and in the present invention. The results are shown in Table 1. It is noted that when the test strips were cut out, the dielectric layers, recording layers and reflective layer remained stuck to the test strips, but the attachment of such layers to the test strips had no influence on the measurements of tensile strength at break, tensile elongation at break and tensile modulus.

The sample was also measured for deflection and axial runout, using an instrument LM1200 by Ono Sokki K.K. After the sample was held for 50 hours in an atmosphere of 80° C. and RH 80%, similar measurement was repeated. The results are shown in Table 1.

Example 2

An optical recording disk sample was fabricated as in Example 1 except that a light-transmitting layer of 100 μm thick was formed by spin coating a UV-curable resin (B8 by Nippon Kayaku Co., Ltd., viscosity 5,000 centipoise at 25° C.) and exposing the coating to UV radiation. The sample was determined for various properties as in Example 1. The results are shown in Table 1.

Example 3

An optical recording disk sample was fabricated as in Example 1 except that a light-transmitting layer of 100 μm thick was formed by spin coating a UV-curable resin (SSP50U14 by Showa Highpolymer Co., Ltd., viscosity 4,000 centipoise at 25° C.) and exposing the coating to UV radiation. The sample was determined for various properties as in Example 1. The results are shown in Table 1.

Comparative Example 1

An optical recording disk sample was fabricated as in Example 1 except that a light-transmitting layer of 100 μm thick was formed by spin coating a UV-curable resin (No. 303-2 by Showa Highpolymer Co., Ltd., viscosity 4,000 centipoise at 25° C.) and exposing the coating to UV radiation. The sample was determined for various properties as in Example 1. The results are shown in Table 1.

Comparative Example 2

An optical recording disk sample was fabricated as in Example 1 except that a light-transmitting layer of 100 μm thick was formed by spin coating a UV-curable resin (T695/UR740 by Ciba-Nagase Co., Ltd., viscosity 2,100 centipoise at 25° C.) and exposing the coating to UV radiation. The sample was determined for various properties as in Example 1. The results are shown in Table 1.

Comparative Example 3

An optical recording disk sample was fabricated as in Example 1 except that a light-transmitting layer of 100 μm thick was formed by spin coating a UV-curable resin (SD318 by Dainippon Ink & Chemicals, Inc., viscosity 140 centipoise at 25° C.) and exposing the coating to UV radiation. The sample was determined for various properties as in Example 1. The results are shown in Table Comparative Example 4

There was furnished the UV-curable resin composition described in Example 3 of JP-A 8-194968. This UV-curable resin composition had the following recipe:

| Component | Parts by weight |
| --- | --- |
| EPA-1 (Nippon Kayaku Co., Ltd.) | 20 |
| MANDA (Nippon Kayaku Co., Ltd.) | 40 |
| THF-A (Kyoei Yusi Co., Ltd.) | 10 |
| R-561 (Nippon Kayaku Co., Ltd.) | 30 |
| Darocur BP (Ciba Specialty Chemicals) | 3 |
| DMBI (Nippon Kayaku Co., Ltd.) | 1 |
| Irgacure 651 (Ciba Specialty Chemicals) | 3 | and had a viscosity of 64 centipoise at 25° C. An optical recording disk sample was fabricated as in Example 1 except that a light-transmitting layer was formed using this UV-curable resin composition. The energy density of UV radiation was 2,000 mW/cm$^2$. Since this UV-curable resin composition had a low viscosity, a light-transmitting layer could not be formed to a thickness in excess of 50 μm. Thus the light-transmitting layer had a thickness of 50 μm. The sample was determined for various properties as in Example 1. The results are shown in Table 1.

have the advantages of a low birefringence, a small distribution breadth of birefringence, less focus errors, a reduced jitter, a reduced deflection, a reduced axial runout, and little exacerbation of deflection and axial runout during hot humid storage.

By contrast, the advantages of the invention are lost when at least one of tensile strength at break, tensile elongation at break and tensile modulus is outside the range of the invention.

A sample was fabricated as in Example 1 except that the inner layer was omitted and the surface layer was formed to a thickness of 100 μm and served as the light-transmitting layer. The light-transmitting layer of this sample was found to have a tensile strength at break of more than 50 MPa.

Example 4

Sample No. 1

An optical recording disk sample was fabricated as in Example 1 except that the light-transmitting layer was formed by the following procedure.

The light-transmitting layer was constructed by first spin coating a UV-curable resin SK5110 (Sony Chemical Co., Ltd.) onto the surface of the first dielectric layer to form a resin layer. Then in vacuum (below 0.1 atm.), a polycarbonate sheet (thickness 100 μm, birefringence 15 nm) as a light-transmitting sheet was placed on the resin layer. The polycarbonate sheet was formed of Pure Ace (Teijin Co., Ltd.) by a casting technique as previously mentioned. This polycarbonate had a glass transition temperature of 145° C. and a molecular weight of about 40,000. With the light-transmitting sheet rested thereon, the disk was rotated at 6,000 rpm for 10 seconds to spin off the extra resin. After the vacuum was relieved back to air, UV radiation was irradiated to cure the resin layer, obtaining a light-transmitting layer of 103 μm thick.

As the UV source, a Xe flash lamp by Eye Graphic Co. was used. UV radiation was irradiated 8 passes at an output of 120 J. The energy density of UV radiation could not be measured (beyond 5,000 mW/cm$^2$), using Uvicure Plus of ETI Instrumentation Products.

Sample No. 2

TABLE 1

| | Tensile strength at break (MPa) | Tensile elongation at break (%) | Tensile modulus (MPa) | Birefringence at wavelength 630 (nm) | | R/F (%) | Jitter (%) | Surface reflectivity (%) | Deflection (μm) | | Axial runout (μm) | |
| --- | --- | --- | --- | --- | --- | --- | --- | --- | --- | --- | --- | --- |
| | | | | Maximum | Distribution breadth | | | | Initial | Aged | Initial | Aged |
| Example 1 | 32 | 68 | 76 | 15 | 8 | 4.53 | 8.8 | 8.0 | −74.8 | −116.3 | 55.8 | 62.4 |
| Example 2 | 17 | 55 | 200 | 16 | 11 | 4.38 | 8.6 | 8.5 | −96.7 | −123.8 | 34.9 | 31.8 |
| Example 3 | 24 | 18 | 784 | 16 | 7 | 4.80 | 9.0 | 10.0 | −68.4 | −110.5 | 48.6 | 42.1 |
| Comparative Example 1 | 44* | 17 | 1044* | 30* | 25* | 8.72 | 12.3 | 11.0* | −186.2 | −284.6 | 111.6 | 108.6 |
| Comparative Example 2 | 4* | 16 | 24* | 19 | 16 | 6.50 | 11.5 | 9.0 | −141.1 | −248.4 | 87.4 | 79.7 |
| Comparative Example 3 | >50* | 5* | >2000* | 54* | 60* | 10.70* | 15.0 | 11.0* | −265.7 | −430.8 | 180.7 | 194.1 |
| Comparative Example 4 | 65* | 4* | 1810* | 30* | 24* | 10.30* | 12.0 | 11.0* | −223.5 | −286.3 | 150.5 | 174.3 |

*outside the specific range

Data in Table 1 demonstrate the effectiveness of the invention. Those samples whose light-transmitting layer has a tensile strength at break, tensile elongation at break and tensile modulus within the specific ranges of the invention An optical recording disk sample was fabricated by the same procedure as Sample No. 1 except that a high-pressure mercury vapor lamp of Ushio Electric Co., Ltd. (3 kW type, radiation energy density 300 mJ/cm² was used as the UV source and the energy density of UV radiation was 600 mW/cm².

Sample No. 3

An optical recording disk sample was fabricated by the same procedure as Sample No. 1 except that a UV-curable resin T695/UR621 of Nagase Chemtec Co., Ltd. was used in forming the adhesive layer, Multi-Light of Ushio Electric Co., Ltd. (250 W type) was used as the UV source, and the energy density of UV radiation was 50 mW/cm².

Sample No. 4

An optical recording disk sample was fabricated by the same procedure as Sample No. 1 except that a light-transmitting layer of 100 μm was formed by spin coating a UV curable resin (B8 by Nippon Kayaku Co., Ltd., viscosity 5,000 centipoise at 25° C.) onto the surface of the first dielectric layer, and exposing the coating to UV radiation. The UV exposure conditions were the same as the curing conditions for the adhesive layer of sample No. 2.

Sample No. 5 (Comparison)

Sample No. 5 is a DVD-RAM (one side 2.6 GB type) by TDK Corporation which is structured such that a recording/reading laser beam reaches through a polycarbonate substrate of 0.6 mm thick.

Sample No. 6 (Comparison)

Sample No. 6 is a DVD-RAM (double side 5.2 GB type) by TDK Corporation which is structured such that a recording/reading laser beam reaches through a polycarbonate substrate of 0.6 mm thick.

Evaluation

The laser beam-incident surface of each sample was measured for roughness parameters (center line average roughness Ra, maximum roughness Rt, center line waviness Wa and maximum waviness Wt) as prescribed in ANSI B46.1. These roughness parameters were measured at a position of radius 40 mm on the laser beam-incident surface. The measurement direction was tangential to the cicumferential direction of the sample, and the measurement length was 20 mm. The measurement was repeated 5 times, and an average was computed. The conditions under which the maximum waviness Wt was measured was the previously-described conditions prescribed in the present invention. The results are shown in Table 2.

For each sample, the ratio R/F of the residual error component (R) of focus error signals to the peak-to-peak value (F) of a focus sensitivity curve was determined while the linear velocity was changed from low to high. The highest linear velocity Vmax at which R/F did not exceed 10% was determined. The results are shown in Table 2. For sample Nos. 1 to 4, the measuring conditions included a laser wavelength of 405 nm and a numerical aperture NA of 0.85; and for sample Nos. 5 and 6, the measuring conditions were the same as in DVD-RAM, that is, included a laser wavelength of 635 nm and a numerical aperture NA of 0.60.

TABLE 2

| Sample No. | Vmax (m/s) | Ra (nm) | Rt (nm) | Wa (nm) | Wt (nm) |
|---|---|---|---|---|---|
| 1 | 7.3 | 1.3 | 21.1 | 293 | 1400 |
| 2 | 10.8 | 1.3 | 18.5 | 273 | 1240 |
| 3 | 12.5 | 1.3 | 17.5 | 258 | 1170 |
| 4 | 28.9 | 1.1 | 9.1 | 144 | 636 |

TABLE 2-continued

| Sample No. | Vmax (m/s) | Ra (nm) | Rt (nm) | Wa (nm) | Wt (nm) |
|---|---|---|---|---|---|
| 5 (comparison) | 24.1 | 1.0 | 9.0 | 414 | 1780 |
| 6 (comparison) | 8.4 | 1.2 | 11.4 | 568 | 2440 |

It is evident from Table 2 that the Vmax differs among distinct samples and that the Vmax is not correlated to Ra and Rt, but to Wa and Wt. FIG. 2 is a graph in which the linear velocity V is on the abscissa and the maximum waviness Wt is on the ordinate. In the graph of FIG. 2, Wt is plotted as a function of Vmax for each sample, and the curve represented by $$Wt = 1840 e^{-0.04V}$$

is depicted.

To operate each of the samples having Wt plotted in FIG. 2 in such a manner that the R/F might be up to 10%, the operating linear velocity V should be below the Vmax of that sample. In FIG. 2, all the samples have Wt plots above the curve represented by $Wt = 1840e^{-0.04V}$. Therefore, when operated at a linear velocity V satisfying $Wt \leq 1840e^{-0.04V}$, all the samples show an R/F of up to 10%.

It is noted that in FIG. 2, sample Nos. 5 and 6 which are commercial DVD-RAM disks show a higher Vmax than sample No. 1, despite their remarkably high Wt as compared with sample No. 1. Then, they can be operated at a remarkably higher linear velocity than the linear velocity V limited by $Wt \leq 1840e^{-0.04V}$. This is because the R/F measuring conditions for sample Nos. 5 and 6 are the same as the reading conditions for DVD-RAM. That is, control of Wt is effective in sample Nos. 1 to 4 in which the beam spot on the beam-incident surface has a diameter of about 120 μm, whereas control of Wt is unnecessary in sample Nos. 5 and 6 in which the beam spot on the beam-incident surface has a diameter as large as about 490 μm.

Japanese Patent Application Nos. 2000-191787 and 2000-363891 are incorporated herein by reference.

What is claimed is:

1. An optical information medium comprising a supporting substrate, an information recording layer thereon, and a light-transmitting layer on the information recording layer wherein a recording or reading laser beam enters the information recording layer through the light-transmitting layer, said light-transmitting layer is formed of a resin and has a tensile strength at break of 5 to 40 MPa, a tensile elongation at break of 15 to 100%, and a tensile modulus of 40 to 1,000 MPa.

2. The optical information medium of claim 1 wherein said light-transmitting layer has a thickness of 30 to 200 μm.

3. An optical information medium of claim 1 wherein said light-transmitting layer in an information recording region has a birefringence in absolute value of up to 20 nm at a wavelength of 630 nm and a birefringence distribution breadth of up to 20 nm at a wavelength of 630 nm.

4. An optical information medium of claim 1 wherein said light-transmitting layer has a surface reflectivity of up to 10% at the wavelength of the recording or reading laser beam.

5. An optical information medium of claim 1 wherein R/F is up to 10% wherein R is a residual error component of a focus error signal at a linear velocity during recording or reading and F is a peak-to-peak value of a focus sensitivity curve.

6. An optical information medium of claim 1 wherein said medium satisfies $Wt \leq 1840e^{-0.04V}$ wherein said light-transmitting layer at its surface has a maximum waviness Wt (in nm) and said medium is moved at a linear velocity V (in m/s) during recording or reading, with the proviso that the recording or reading laser beam defines on the surface of said light-transmitting layer a beam spot having a diameter of up to 300 μm.

7. The optical information medium of claim 1 which is to be operated at a linear velocity of at least 8 m/s.

8. The optical information medium of claim 1 on which recording or reading is performed by a system including an objective lens having a numerical aperture NA and emitting a recording or reading beam having a wavelength of λ wherein $\lambda/NA \leq 780$ nm.

9. An optical information medium comprising a supporting substrate, an information recording layer thereon, and a light-transmitting layer on the information recording layer wherein a recording or reading laser beam enters the information recording layer through the light-transmitting layer, wherein said medium satisfies $Wt \leq 1840e^{-0.04V}$ wherein said light-transmitting layer at its surface has a maximum waviness Wt (in nm) and said medium is moved at a linear velocity V (in m/s) during recording or reading, with the proviso that the recording or reading laser beam defines on the surface of said light-transmitting layer a beam spot having a diameter of up to 300 μm.

10. The optical information medium of claim 9 wherein said light-transmitting layer includes a light-transmitting sheet formed of a resin and an adhesive layer which joins the light-transmitting sheet to the supporting substrate side, said adhesive layer comprising a cured product of a UV-curable resin and having an average thickness of 0.5 μm to less than 5 μm.

11. The optical information medium of claim 9 wherein said light-transmitting layer includes a light-transmitting sheet formed of a resin and an adhesive layer which joins the light-transmitting sheet to the supporting substrate side, said light-transmitting sheet being constructed from a polycarbonate, polyarylate or cyclic polyolefin by a casting technique.

12. The optical information medium of claim 9 which is to be operated at a linear velocity of at least 8 m/s.

13. The optical information medium of claim 9 on which recording or reading is performed by a system including an objective lens having a numerical aperture NA and emitting a recording or reading beam having a wavelength of λ wherein $\lambda/NA \leq 780$ nm.

14. A method for preparing the optical information medium of claim 9, in which said light-transmitting layer includes a light-transmitting sheet formed of a resin and an adhesive layer which joins the light-transmitting sheet to the supporting substrate side, said adhesive layer being comprised of a cured product of a UV-curable resin, said method comprising the step of irradiating UV radiation to a coating of the UV-curable resin for curing the resin to form said adhesive layer, the UV radiation irradiated having an energy density of up to 1,000 mW/cm².

* * * * *

UNITED STATES PATENT AND TRADEMARK OFFICE
CERTIFICATE OF CORRECTION

PATENT NO.    : 6,667,952 B2
DATED         : December 23, 2003
INVENTOR(S)   : Komaki et al.

It is certified that error appears in the above-identified patent and that said Letters Patent is hereby corrected as shown below:

<u>Title page,</u>
Item [75], Inventors should read:
 -- [75] Inventors: Tsuyoshi Komaki, Tokyo (JP);
                      Hideki Hirata, Tokyo (JP);
                      Tatsuya Kato, Tokyo (JP) --

Signed and Sealed this

Eighteenth Day of May, 2004

JON W. DUDAS
*Acting Director of the United States Patent and Trademark Office*